J. W. WADSWORTH.
Rein Holder.
No. 80,434.             Patented July 28, 1868.
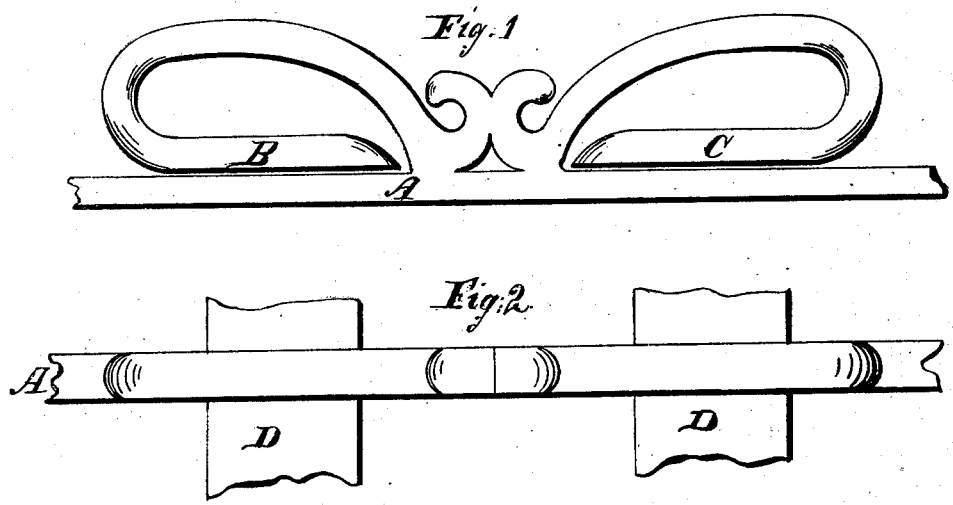
Witnesses:
J. H. Shumuey
A. J. Tibbits
Inventor:
James W. Wadsworth
By his Attorney
John E. Earle

United States Patent Office.

JAMES W. WADSWORTH, OF DURHAM, CONNECTICUT.

Letters Patent No. 80,434, dated July 28, 1868.

IMPROVEMENT IN REIN-HOLDER.

*The Schedule referred to in these Letters Patent and making part of the same.*

TO ALL WHOM IT MAY CONCERN:

Be it known that I, JAMES W. WADSWORTH, of Durham, in the county of Middlesex, and State of Connecticut, have invented a new Improvement in Rein-Spring for carriage dash-boards; and I do hereby declare the following, when taken in connection with the accompanying drawings, and the letters of reference marked thereon, to be a full, clear, and exact description of the same, and which said drawings constitute part of this specification, and represent, in—

Figure 1, a side view, and in

Figure 2 a top view.

This invention is designed for attachment to carriage dash-boards, for the purpose of securing the reins when the driver leaves the carriage; and consists in the arrangement of a pair of springs, turning to the right or left hand, upon the top bar of the dash-board, so that the rein may be drawn under each spring, and the spring of sufficient power to retain the rein in that position.

To enable others to construct and use my improvement, I will proceed to describe the same as illustrated in the accompanying drawings.

I form the springs upon or attach them to the top bar A of the dash-board, and of any desirable form or design. B the one spring, C the other, turning from the centre out, and resting upon the top of the dash-board, as seen in fig. 1, so as to form a bearing upon the dash-board below the springs B and C, the springs being of such strength that the reins D and E may be easily drawn, one under each spring, as seen in fig. 2, and so as to hold the reins in that position, but yet so that the driver may easily draw them from under the spring, and thus form a convenient device and place for securing the reins, and if so secured under the spring sufficiently taut they serve as a means for securing the horse, for, if so secured, the horse starts, the springs hold the reins with sufficient strength to arrest his movement.

I do not wish to be understood as broadly claiming the arrangement of springs upon the dash-board for the purpose of holding the reins.

Having thus fully described this invention, what I claim as new and useful, and desire to secure by Letters Patent, is—

The construction and arrangement of the springs B C upon the bar A and dash-board, so as to be a part of the same, and operate in the manner set forth.

JAMES W. WADSWORTH.

Witnesses:
 A. J. TIBBITS,
 J. H. SHUMWAY.